US010866834B2

(12) United States Patent
Herdrich et al.

(10) Patent No.: US 10,866,834 B2
(45) Date of Patent: Dec. 15, 2020

(54) APPARATUS, METHOD, AND SYSTEM FOR ENSURING QUALITY OF SERVICE FOR MULTI-THREADING PROCESSOR CORES

(71) Applicant: Intel Corporation, Santa Clara, CA (US)

(72) Inventors: Andrew Herdrich, Hillsboro, OR (US); Ian Steiner, Portland, OR (US); Leeor Peled, D.N. Hefer (IL); Michael Prinke, Aloha, OR (US); Eylon Toledano, Qiryat yam (IL)

(73) Assignee: Intel Corporation, Santa Clara, CA (US)

( * ) Notice: Subject to any disclaimer, the term of this patent is extended or adjusted under 35 U.S.C. 154(b) by 63 days.

(21) Appl. No.: 16/370,248

(22) Filed: Mar. 29, 2019

(65) Prior Publication Data
US 2020/0310865 A1     Oct. 1, 2020

(51) Int. Cl.
*G06F 9/46*        (2006.01)
*G06F 9/48*        (2006.01)
(Continued)

(52) U.S. Cl.
CPC ............ *G06F 9/4881* (2013.01); *G06F 9/38* (2013.01); *G06F 9/4818* (2013.01); *G06F 9/544* (2013.01);
(Continued)

(58) Field of Classification Search
CPC .... G06F 9/4881; G06F 13/4282; G06F 9/468; G06F 9/3851; G06F 3/064; G06F 3/067;
(Continued)

(56) References Cited

U.S. PATENT DOCUMENTS

2003/0037228 A1    2/2003   Kelsey et al.
2006/0179439 A1    8/2006   Jones et al.
(Continued)

FOREIGN PATENT DOCUMENTS

WO     2016/115000 A1     7/2016

OTHER PUBLICATIONS

European Search Report and Search Opinion, EP App. No. 20153029.2, dated Aug. 14, 2020, 13 pages.
(Continued)

*Primary Examiner* — Tuan A Vu
(74) *Attorney, Agent, or Firm* — Nicholson De Vos Webster & Elliott LLP

(57) ABSTRACT

A simultaneous multi-threading (SMT) processor core capable of thread-based biasing with respect to execution resources. The SMT processor includes priority controller circuitry to determine a thread priority value for each of a plurality of threads to be executed by the SMT processor core and to generate a priority vector comprising the thread priority value of each of the plurality of threads. The SMT processor further includes thread selector circuitry to make execution cycle assignments of a pipeline by assigning to each of the plurality of threads a portion of the pipeline's execution cycles based on each thread's priority value in the priority vector. The thread selector circuitry is further to select, from the plurality of threads, tasks to be processed by the pipeline based on the execution cycle assignments.

25 Claims, 16 Drawing Sheets

(51) Int. Cl.
*G06F 9/54* (2006.01)
*G06F 9/38* (2018.01)
G06F 3/06 (2006.01)
H04L 12/24 (2006.01)

(52) U.S. Cl.
CPC ...... *G06F 3/064* (2013.01); *G06F 2209/5018* (2013.01); *G06F 2209/5021* (2013.01); *G06F 2212/1024* (2013.01); *H04L 41/5025* (2013.01)

(58) Field of Classification Search
CPC ..... G06F 2212/1024; G06F 2209/5018; G06F 2209/5021; G06F 9/4818; G06Q 40/025; H04L 41/5025
See application file for complete search history.

(56) References Cited

U.S. PATENT DOCUMENTS

| | | | |
|---|---|---|---|
| 2006/0184946 A1* | 8/2006 | Bishop | G06F 9/3851 718/102 |
| 2011/0225590 A1* | 9/2011 | Thomson | G06F 9/4881 718/103 |
| 2015/0020075 A1* | 1/2015 | Glew | G06F 9/468 718/101 |
| 2016/0284021 A1* | 9/2016 | Herdrich | G06Q 40/025 |
| 2017/0091108 A1* | 3/2017 | Arellano | G06F 13/4282 |

OTHER PUBLICATIONS

Herdrich et al., "SMT QoS: Hardware Prototyping of Thread-level Performance Differentiation Mechanisms", 4th Usenix Workshop on Hot Topics in Parallelism, Jun. 7, 2012, 6 pages.

* cited by examiner

CLOS-TO-PRIORITY MAPS
144

| REGISTER_0 | $P(CLOS_0)$ | $P(CLOS_1)$ | $P(CLOS_2)$ | ... | $P(CLOS_{N-1})$ |
|---|---|---|---|---|---|
| REGISTER_1 | $P(CLOS_N)$ | $P(CLOS_{N+1})$ | $P(CLOS_{N+2})$ | ... | $P(CLOS_{2N-1})$ |
| ... | | | | | |
| REGISTER_N | $P(CLOS_{MN})$ | $P(CLOS_{MN+1})$ | $P(CLOS_{MN+2})$ | ... | $P(CLOS_{MN+N-1})$ |

X bits

FIG. 2A

| T0_PRIO | T1_PRIO | T2_PRIO | T3_PRIO | COMBINATION # | T0_DUTY | T1_DUTY | T2_DUTY | T3_DUTY |
|---|---|---|---|---|---|---|---|---|
| 0 | 0 | 0 | 0 | 0000 | 25% | 25% | 25% | 25% |
| 1 | 1 | 1 | 1 | 1111 | 25% | 25% | 25% | 25% |
| 2 | 2 | 2 | 2 | 2222 | 25% | 25% | 25% | 25% |
| 1 | 0 | 0 | 0 | 1000 | 57% | 14% | 14% | 14% |
| 2 | 0 | 0 | 0 | 2000 | 84% | 5% | 5% | 5% |
| 1 | 1 | 0 | 0 | 1100 | 40% | 40% | 10% | 10% |
| 2 | 2 | 0 | 0 | 2200 | 47% | 47% | 3% | 3% |
| 2 | 2 | 1 | 1 | 2211 | 40% | 40% | 10% | 10% |
| 2 | 1 | 1 | 0 | 2110 | 64% | 16% | 16% | 4% |
| 2 | 2 | 1 | 0 | 2210 | 43% | 43% | 11% | 3% |
| 2 | 1 | 0 | 0 | 2100 | 73% | 18% | 5% | 5% |

FIG. 4

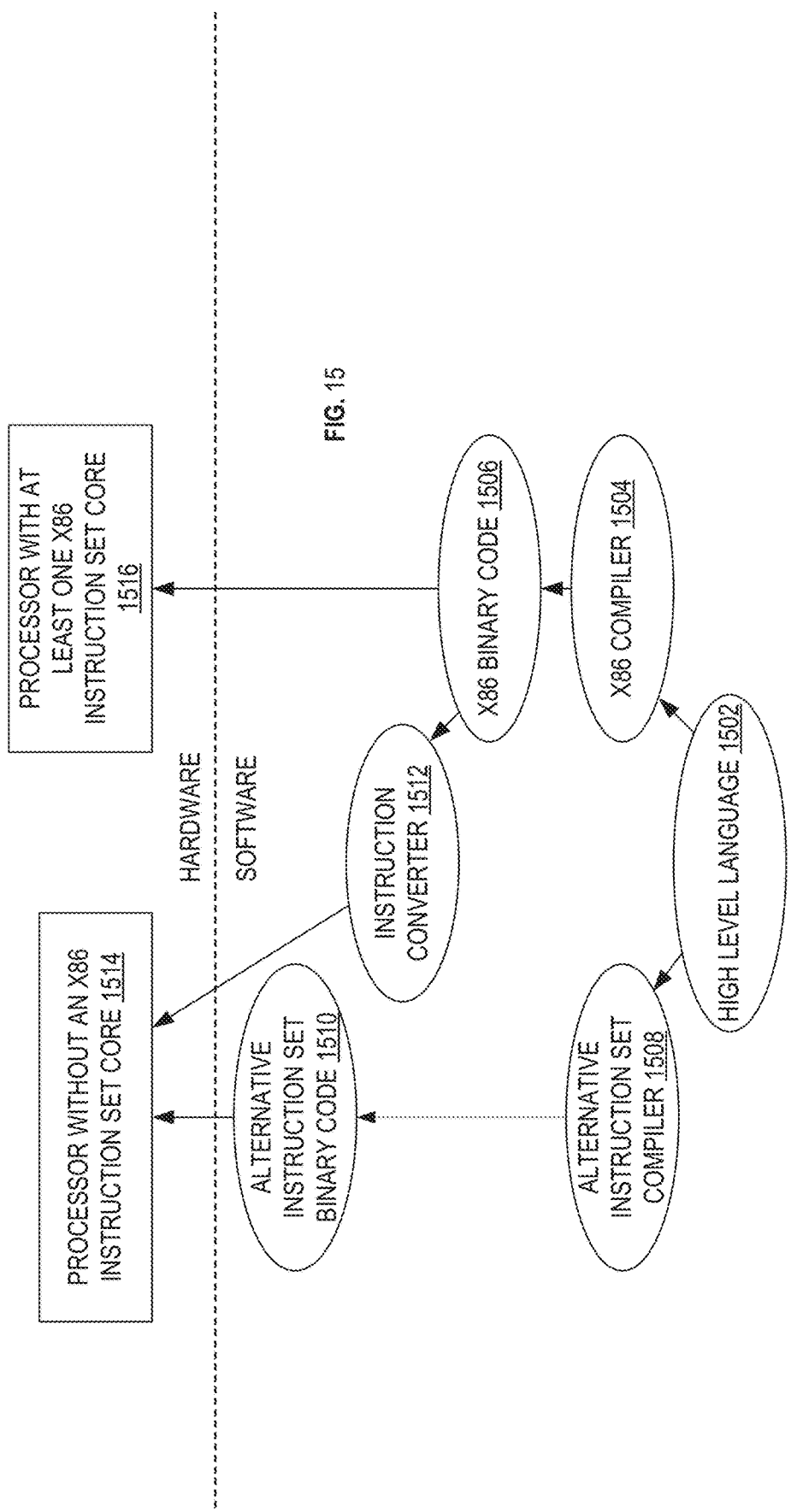

APPARATUS, METHOD, AND SYSTEM FOR ENSURING QUALITY OF SERVICE FOR MULTI-THREADING PROCESSOR CORES

TECHNICAL FIELD

Embodiments of the invention described herein relate generally to quality of service (QoS) in a computer processing system. In particular, the disclosure relates to computer architectural extensions for ensuring QoS in a multi-threaded processor core capable of simultaneous multi-threading.

BACKGROUND ART

Modern processor cores often support simultaneous multi-threading (SMT) which runs multiple thread contexts in parallel while sharing or partitioning the core resources and pipelines. However, when running in SMT mode, many, if not all, of the threads may experience a performance degradation because they have to compete with each other over the core's resources and pipelines. This means that if a thread is expected to achieve a certain level of performance due to, for example, real-time constraints or priority requirements, there is no guarantee that the expected performance can be achieved in an SMT core. Rather, it is more likely that the thread will fall below the expected performance level. In some tests, the performance of a thread executed in an SMT core may sometimes incur as much as 10 times the performance degradation as that of a thread executed in a single-threaded core. Such disparity and uncertainty in performance suggest a need for a way to introduce bias into the SMT cores such that one or more selected threads can be favored over others to ensure their level of performance.

BRIEF DESCRIPTION OF THE DRAWINGS

The invention may best be understood by referring to the following description and accompanying drawings that are used to illustrate embodiments of the invention. In the drawings:

FIG. 2A is a block diagram illustrating the details of the class of service-to-priority maps according to an embodiment;

FIG. 4 is a table illustrating the execution cycle distribution for some exemplary priority value combinations according to an embodiment;

FIG. 15 illustrates a block diagram contrasting the use of a software instruction converter to convert binary instructions in a source instruction set to binary instructions in a target instruction set according to embodiments of the invention.

DETAILED DESCRIPTION

Embodiments of apparatus, method, and system for ensuring quality of service in multi-threaded processor cores are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the Figures herein may be referred to by their labels in the Figures, rather than by a particular reference number.

Figure 1:
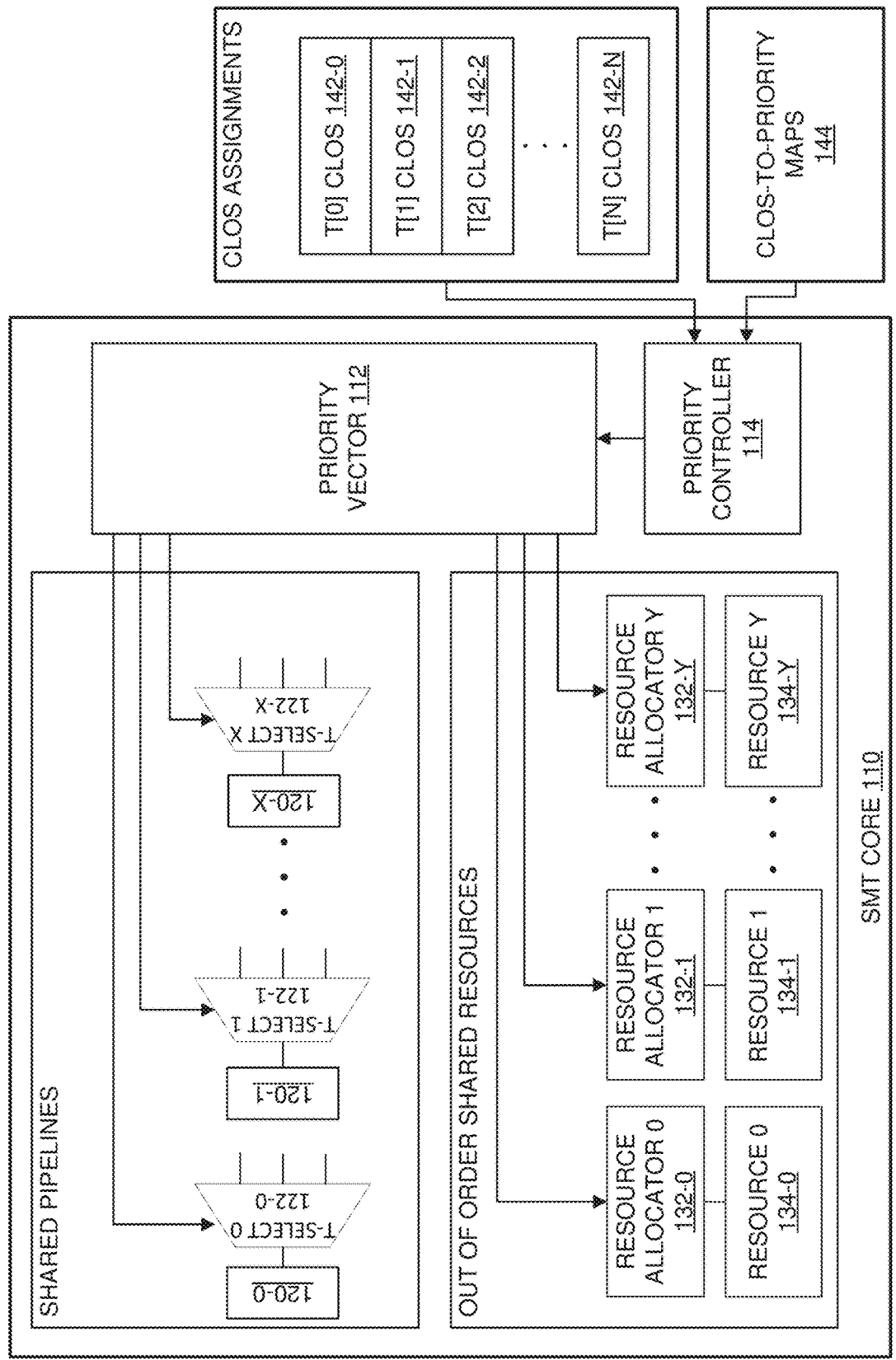
FIG. 1 is an embodiment of a processor core on which aspects of the present invention may be implemented.

FIG. 1 is an embodiment of a processor core on which aspects of the present invention may be implemented. SMT core 110 is a multi-threaded processor core capable of simultaneous multi-threading (SMT), including running multiple thread contexts in parallel while sharing or partitioning the core's resources and pipelines. SMT core 110 may include one or more shared pipelines 120 and/or one or more out-of-order (OOO) shared resources 134. Each shared pipeline 120 is associated with a respective thread selector 122 and each OOO shared resource 134 is associated with a respective resource allocator 132. The SMT core 110 may further include a priority controller 114. Each of the thread selectors 122, resource allocators 132, and priority controller 114 may be implemented by software program/code, hardware circuits or circuitry, or a combination thereof. The priority controller 114 may be communicatively coupled to access class of service (CLOS) assignments 142 and/or CLOS-to-priority maps 144. The CLOS assignments 142 and CLOS-to-priority maps 144 may be stored in registers such as general registers and machine specific registers (MSRs), as well as any other suitable storage structures or locations. The CLOS assignments 142 and CLOS-to-priority maps 144 may be accessed and/or modified, by users, operating systems, or applications to assign the desired CLOS and priority values for any threads to be executed by the SMT core 110. While shown as elements separate to the SMT core 110, storage for the CLOS assignments 142 and CLOS-to-priority maps 144 may be implemented in some embodiments as within, or part of, the SMT core 110.

According to an embodiment, each CLOS assignment 142 corresponds to a different thread and stores the CLOS value assigned to, or associated with, the corresponding thread. The CLOS value associated with each thread is used to divide the threads into different groups, such that all threads within the same group may share the same level of priority, importance, and/or micro-architecture configuration. Each of the CLOS values is further mapped to a respective thread priority value. The priority value mapped to each CLOS value is stored in the CLOS-to-priority maps 144. The priority value associated with each thread is used at runtime to determine which of the threads to be executed by the SMT core 110 have a higher priority and by how much. The higher priority threads are given preference in the execution order and/or resource allocation over lower priority threads. The priority values are used to manage the SMT core's QoS features with respect to the threads.

FIG. 2A is a block diagram illustrating the details of the CLOS-to-priority maps according to an embodiment. CLOS-to-priority maps 144 may include one or more registers (registers 0-N). Each of the registers may include one or more x-bit entries. Each of the entries corresponds to a CLOS value and stores the priority value of that CLOS value. In one embodiment, each of the registers is 64 bits and holds sixteen 4-bit priority values (i.e. X=4). The 4 bits used for the priority value means that the embodiment may implement up to 16 (i.e. 2^4) different levels of priority. Of course, any number of bits may be used for the register and the priority value to implement the desired number of levels of priority.

Figure 2B:
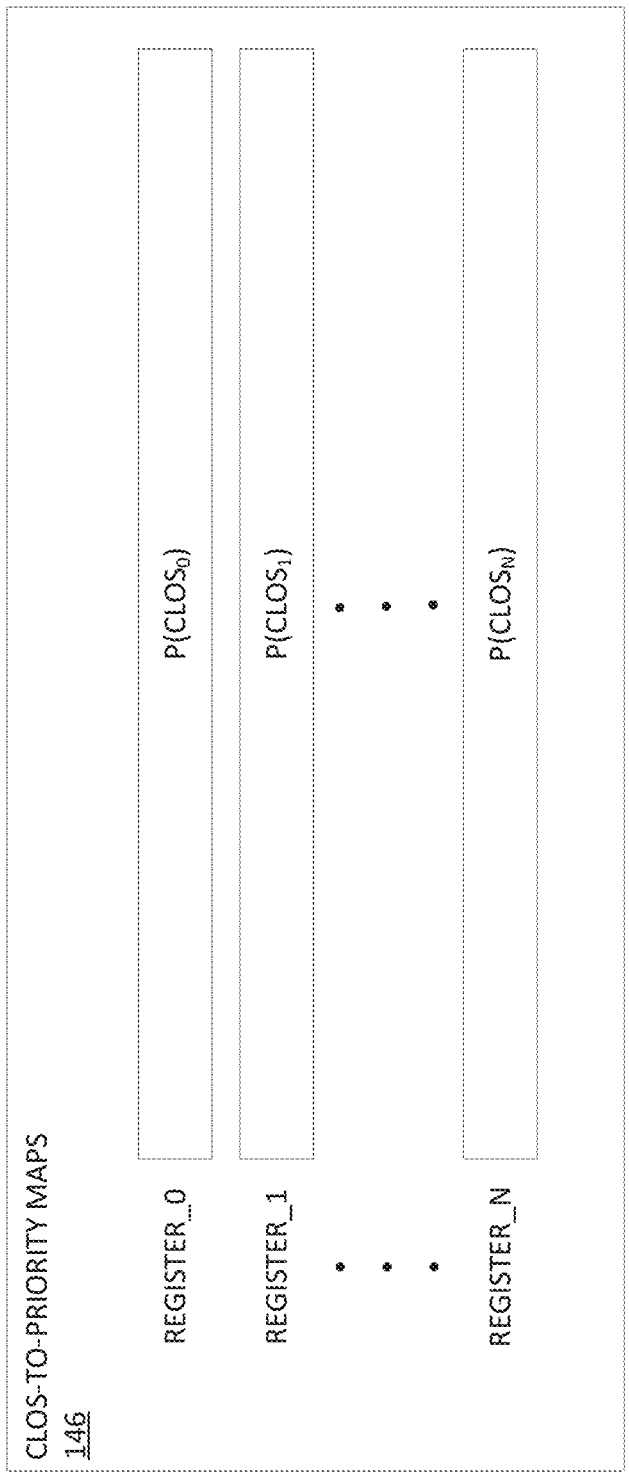
FIG. 2B is a block diagram illustrating the details of an alternate implementation of the CLOS-to-priority maps in accordance to an embodiment.

FIG. 2B is a block diagram illustrating the details of an alternate implementation of the CLOS-to-priority maps in accordance to an embodiment. In FIG. 2B, the CLOS-to-priority maps 146 includes one or more registers (register 0-N). Each register corresponds to a single CLOS value and stores the priority value associated with that CLOS value.

Referring back to FIG. 1, the priority controller 114 associated with the SMT core 110 reads the CLOS assignments 142 and for each thread in the CLOS assignments, the priority controller 114 performs a lookup in the CLOS-to-priority maps 144 to find a priority value for each of the threads based on their respective CLOS value. According to some embodiments, the priority controller 114 is further to generate a priority vector 112 containing the priority values of each of the threads.

Figure 3:
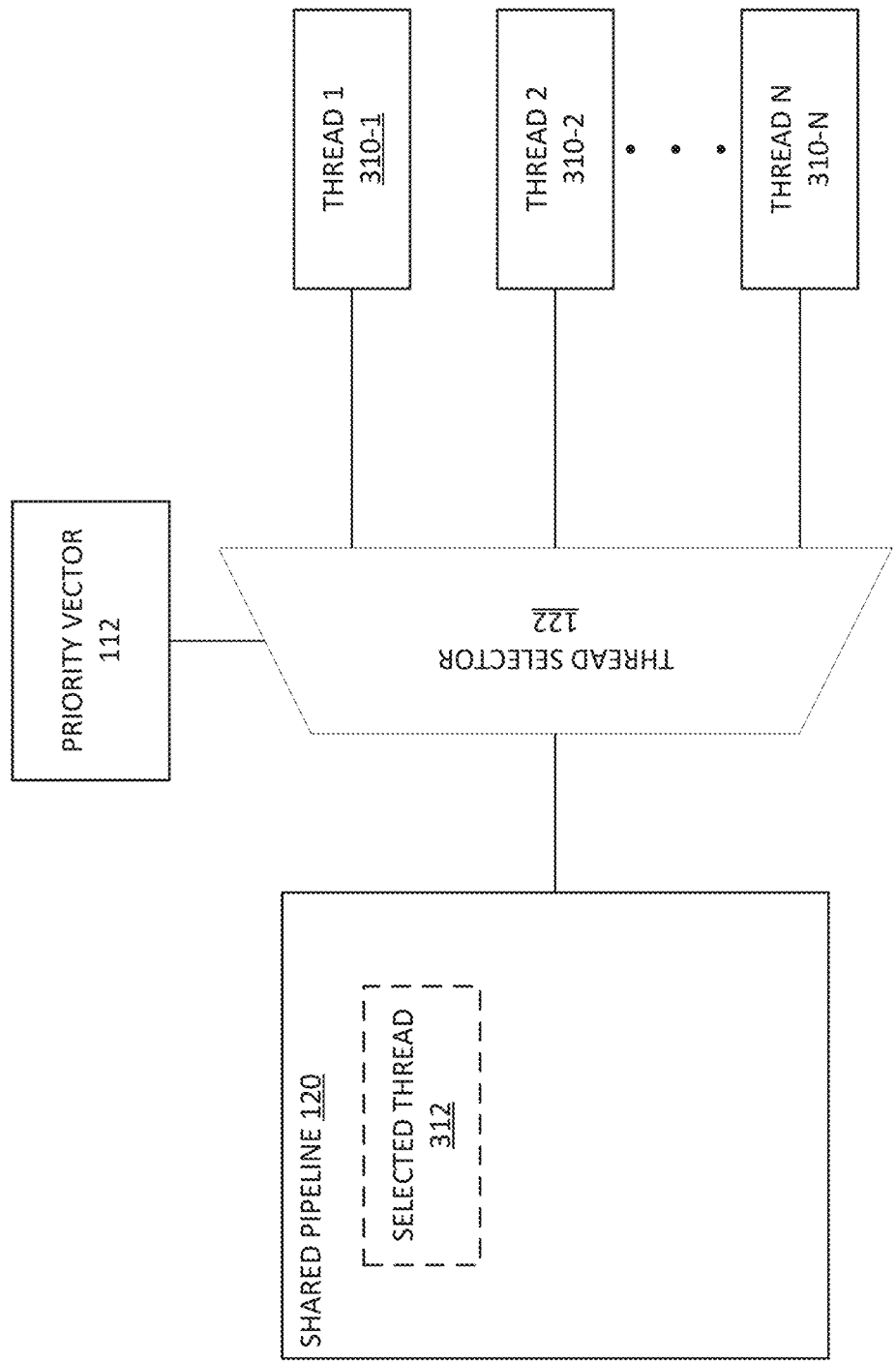
FIG. 3 is a block diagram illustrating a thread selector and the corresponding shared pipeline in accordance to an embodiment.

The generated priority vector is then sent to various arbitration points within the SMT core 110. One type of arbitration point, according to an embodiment, is a thread selector for a shared pipeline or pipeline stage. FIG. 3 is a block diagram illustrating a thread selector and the corresponding shared pipeline in accordance to an embodiment. As illustrated, shared pipeline 120 is associated with a thread selector 122 which selects a thread from a group of threads 310 based on the priority value associated with each of the threads. The selected thread 312 is then processed by the shared pipeline 120. The thread selector 122 thus controls the ownership of the pipeline at any given cycle. Since the pipelines are resources shared among threads, biasing the cycles in favor of higher priority threads will give the higher priority threads better chance to progress in the pipeline and beyond. The earlier the thread selector is, the more influence it may have over the performance of the threads. In addition, some thread selectors are associated with pipelines that deallocate entries from partitioned sources. As such, these thread selectors effectively serve as a way to "increase" the partition of high priority threads by favoring their deallocation, all without directly changing the partitioning scheme.

According to an embodiment, the biasing between different threads is implemented through a duty cycle. The thread selector 122 assigns to each thread a portion out of a large window of the pipeline's execution cycles. During any particular execution cycle, the thread to which the execution cycle is assigned (the owner thread) will always be selected for processing or execution by the pipeline so long as the owner thread has tasks (or instructions) ready to be processed or executed. However, if there are no tasks ready from the owner thread, then execution cycle may be reassigned to other threads. According to an embodiment, the execution cycle is reassigned using the same assignment policy as when thread biasing is not used, such as a least recently used (LRU) policy or a round robin policy. Of course, any suitable policy may be used. In another embodiment, the execution cycle is reassigned to a thread with the same or higher priority as the owner thread. If no such thread exists, or if such thread does not have a task ready, then a thread with the next highest priority level is assigned the execution cycle.

In an exemplary embodiment, an execution cycle window spans 256 execution cycles. The size of the window may be configured by the user, operating system, or application. In one embodiment, the window size is set through registers (e.g., control registers). It is important to note that the window size used should be large enough to enable the higher priority thread the opportunity to dominate the shared pipeline and to issue enough long-standing tasks (e.g., memory misses, page walks, et.). A large window can also reduce the overhead associated with the frequent switching of threads or thread context.

According to an embodiment, thread selector 122 of a pipeline 120 assigns each thread a portion of the pipeline's execution cycles based on each thread's priority value, which is determined from the priority vector received from the priority controller 114. A thread with a higher priority value is assigned a larger portion of the execution cycles while a thread with a lower priority value is assigned a smaller portion of the execution cycles. Threads having the same priority value are assigned the same size portion of the execution cycles. Thus, if all threads have the same priority value, then the execution cycles should be distributed equally among the threads regardless of what the priority value is. The portion of the execution cycles a thread is assigned as a percentage of the total execution cycles in the window may be determined by the formula:

$$Duty_{[T_i]} = \frac{N^{prio[T_i]}}{\sum_j (N^{prio[T_j]})} \, i \in [0, 3], N \geq 2$$

Where N controls the aggressiveness of the bias such that the bigger the N value, the more any priority "counts". According to an embodiment, N is configurable by the user, operating system, or application, such as through the user of registers. The result $Duty_{[T_i]}$ represents the respective portion (i.e. percentage) of the total execution cycles that a thread ($T_i$) will receive within the window based on its priority value. Alternatively, instead of using the formula, the number and/or percentage of the execution cycles to be assigned to each priority value/level may be explicitly set. For example, the user, operating system, and/or application may manually specify a number or a percentage for each of the priority value/level. The number and/or the percentage of the execution cycles may even be set on an individual thread basis. Once again, these configurations may be done through the use of registers such as control registers. For instance, a user may specify that threads with a high priority value are assigned 80% of the execution cycles to be divided among them, while the remaining 20% is split between the lower priority threads.

As noted above, during the execution cycle that is assigned to an owner thread, the owner thread gets full priority over all other threads. This means if the owner thread has tasks or instruction ready to be processed or executed by the pipeline, it will always win. If the owner thread is not ready, then the execution cycle is reassigned to other threads in a fair fashion (e.g., LRU, round robin, etc.). Alternatively, the execution cycle may be reassigned in a biased fashion (next highest priority thread). According to an embodiment, threads with a low priority value (e.g., 0) automatically relinquishes the ownership of their assigned execution cycles which are then reassigned to other threads utilizing one of the reassignment policies described above. Alternatively, low priority threads may not be assigned any execution cycles at all. Instead, they will compete for execution cycles during execution cycles that are available to be arbitrated by threads of all different priority levels (e.g., during the reassignment of an execution cycle). According to an embodiment, there may also be execution cycle windows where QoS is not enforced so that all threads are able to compete for execution cycles in these windows under LRU or round robin policies.

Examples of the pipelines in which thread biasing may be utilized include instruction fetch queues (where instructions from a selected thread are fetched), instruction decode queues (where instructions from a selected thread are decoded), branch prediction units, execution queues (where instructions from a selected thread are executed), retirement queues (where instructions from a selected thread are retired), etc. It should be appreciated that any pipeline or pipeline stage that is shared by one or more threads utilize the techniques disclosed herein to bias or favor its performance towards one or more selected threads FIG. 4 is a table illustrating the execution cycle distribution for some exemplary priority value combinations according to an embodiment. Specifically, the embodiment assumes 4 threads (T0-T3). The possible priority values for each thread range between 0 and 2, with 0 being the lowest and 2 being the highest. As illustrated, in cases where all four threads are associated with the same priority (e.g., combination #0000, #1111, and #2222), each of the four threads does receive an equal portion of the execution cycle (25%) regardless of the priority. By contrast, in case where a single thread must receive the most execution cycles and thus was assigned the highest priority value (e.g., combination #2000), the thread (T0) with the highest priority does indeed receive the largest portion of the execution cycles (84%). Each of the other threads (T1-T3), which may be activated merely for execution throughput, received a significantly smaller portion of the execution cycles (5%) than thread T1. This reflects the desired behavior.

Figure 5:
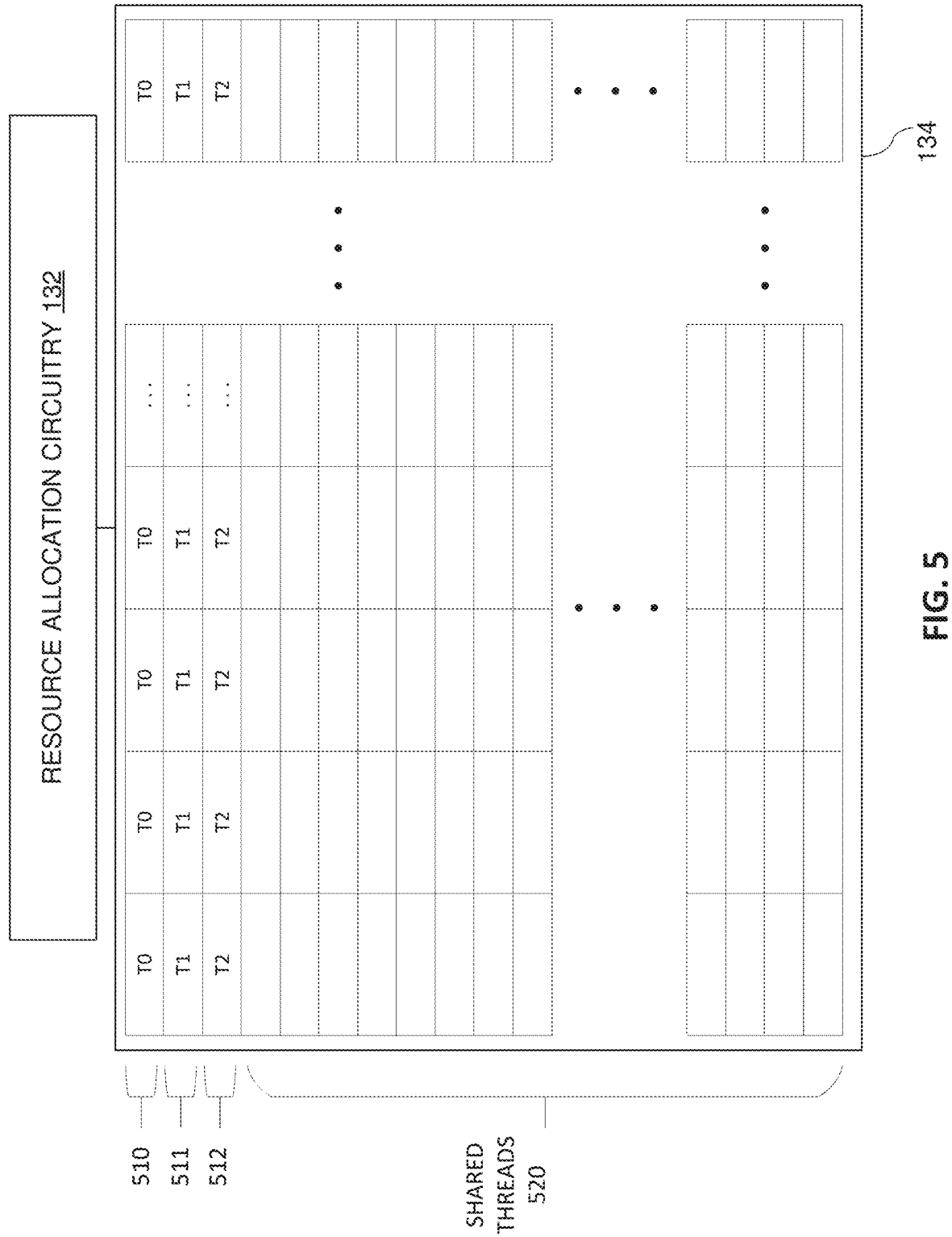
FIG. 5 is a block diagram illustrating the resource allocation made by a resource allocator in accordance to an embodiment.

Besides the thread selector of pipelines, another type of the arbitration point, according to embodiments, is a resource allocator that controls out-of-order (OOO) shared resource. As illustrated in FIG. 110, the SMT core 110 may include one or more OOO shared resources 134 each of which is associated with a respective resource allocator 132. Example of an OOO shared resources include the reservation stations (RS). The RS are decoupled storage arrays used to hold operands just before the operands are issued to the execution units. The number of reservation stations allocated to a given thread plays a large role in determining the thread's effective instruction window, which directly relates to how much out-of-order benefit a thread can achieve. FIG. 5 is a block diagram illustrating the resource allocation made by a resource allocator in accordance to an embodiment. As shown, resource 134 includes multiple entries which are to be allocated to three different threads T0, T1, and T2. When QoS or biasing between threads is implemented, the resource allocation circuitry 132 allocates a relatively small portion of the resource (e.g., 1 entry) to each of the threads so that they can all progress forward. As illustrated by FIG. 5, one or more entries are first allocated to each of the three threads T0, T1, and T2. Specifically, entries 510 are allocated to thread T0, entries 511 are allocated to thread T1, and entries 512 are allocated to thread T2. Entries 510, 511, and 512 contain the same number of entries. The remaining entries 520 which are unallocated become shared entries. When QoS or biasing is in effect, a thread with low priority (e.g., priority 0) is limited to using only its allocated entries. On the other hand, a thread with high priority (e.g., priority 2) will be permitted to use not only its own allocated entries, but also any of the shared entries. According to an embodiment, if there are multiple threads with high priority, the shared entries will be shared between them.

Figure 6:
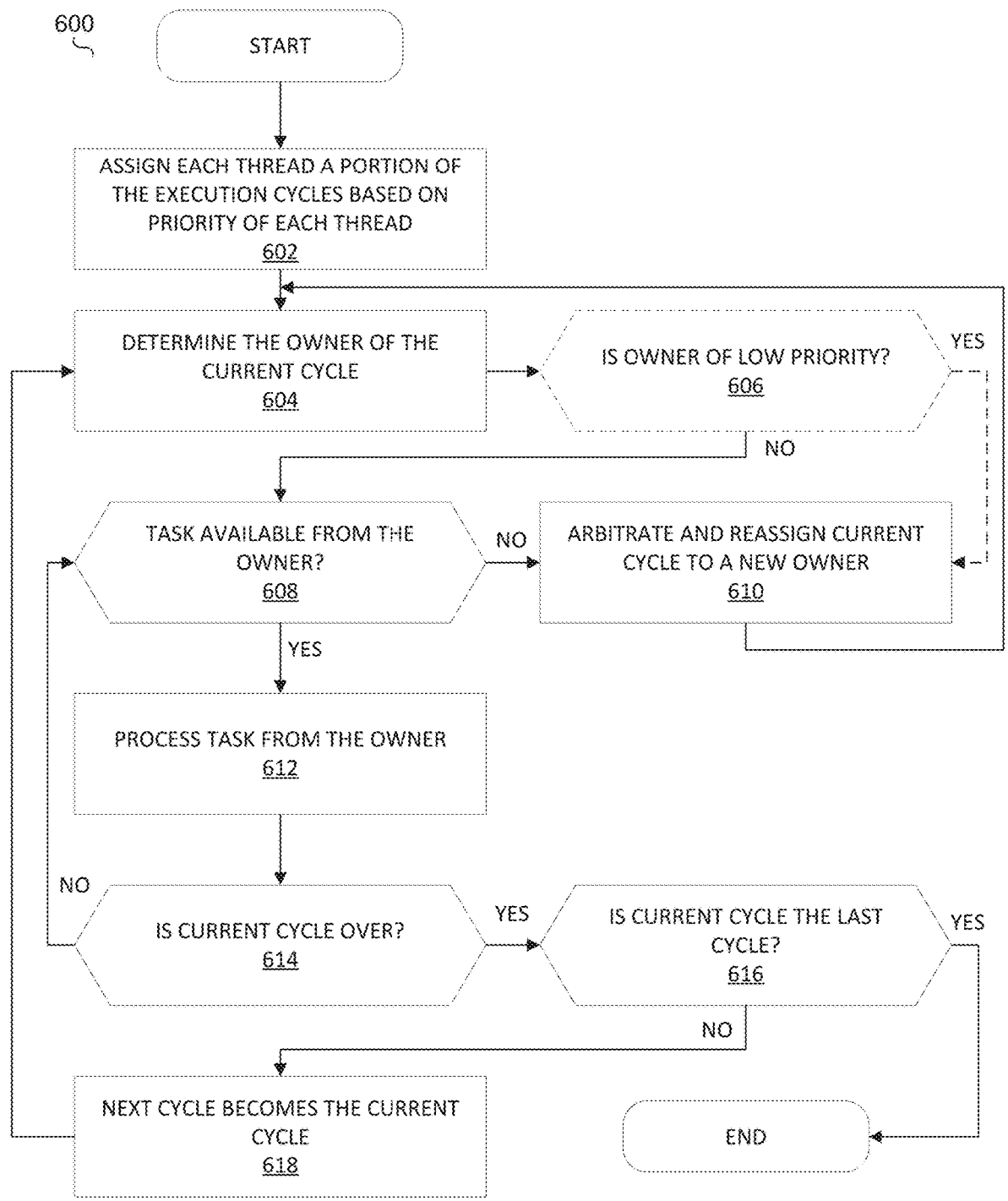
FIG. 6 is a flow diagram illustrating the logic and operations of a method for biasing the execution of threads based on each thread's respective priority value according to an embodiment.

FIG. 6 is a flow diagram illustrating the logic and operations of a method for biasing the execution of threads based on each thread's respective priority value according to an embodiment. Method 600 may be performed by any of the shared pipelines and/or thread selector described in this disclosure. Method 600 begins at the start block and moves to block 602 where each thread that is to be executed by a pipeline is assigned a portion of the pipeline's execution cycles based on the priority value associated with each of the threads. The priority value of each thread may be looked up in a priority vector, which contains the priority value of all of the threads to be executed. The priority value of each thread may be determined based on the thread's assigned CLOS value. According to an embodiment, a thread with a higher priority value is assigned a larger portion of the pipeline's execution cycles than a thread with a lower priority value. Threads with the same priority value are assigned the same size portion of the execution cycles. At block 604, an owner of the current execution cycle is determined. The owner of the current cycle is a thread to which the current execution cycle is assigned. At block 606, which is optional as indicated by the dash lines, a determination is made on whether the owner is associated with a low priority value, (e.g., priority 0 or the lowest priority). If the owner is associated with a low priority value, the owner relinquishes ownership of the current execution cycle and the current execution cycle is then arbitrated between the other threads and assigned to a new owner at block 610. As described above, the new owner may be selected based on policies such as LRU, round robin, next highest priority thread, etc. After a new owner is assigned to the current execution cycle, the method returns to block 604. On the other hand, if it is determined back at block 606 that the owner is not associated with a low priority value, or if block 606 is not implemented at all, then the method proceeds to block 608. At block 608, a determination is made on whether the owner thread has a task (or instruction) ready to be executed by the pipeline. If the answer is no, then at block 610, the current execution cycle is arbitrated among other threads and assigned to a new owner. If, however, the owner of the current execution cycle does have a task ready for the pipeline, the task is executed by the pipeline at block 612. At block 614, a determination is made on whether the current execution cycle is over. If the current cycle is not yet over, the method returns to block 608 to see if the owner has any more tasks ready for the pipeline. If, however, it is determined at block 614 that the current cycle is over, then at block 616, a determination is made on whether the current cycle is the last execution cycle in the window. If the current execution cycle is the last cycle in the window, the method ends. Otherwise, at block 618, the next execution cycle becomes the new current execution cycle and the method returns to block 604, where the owner of new execution cycle is determined.

Figure 7:
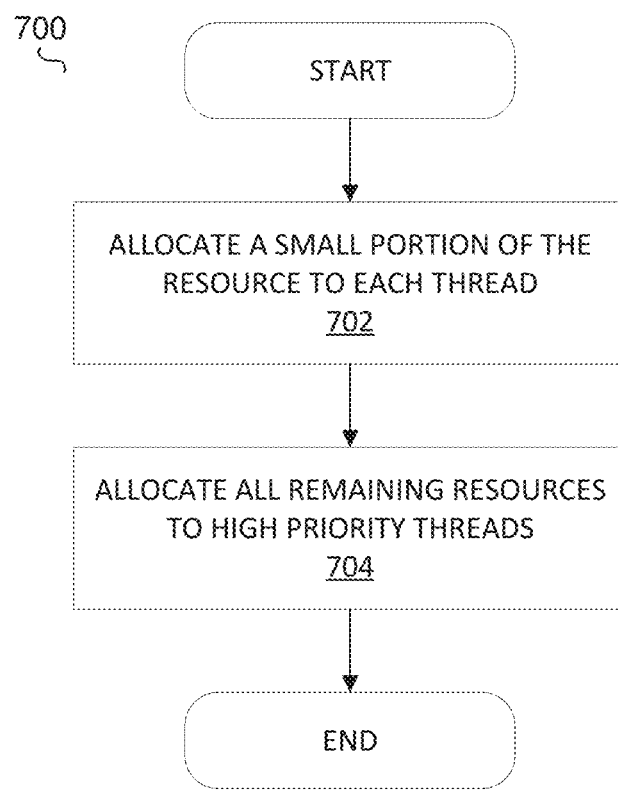
FIG. 7 is a flow diagram illustrating the logic and operation of a method to allocate an out-of-order resource among threads in an SMT core according to an embodiment.

FIG. 7 is a flow diagram illustrating the logic and operation of a method to allocate an out-of-order resource among threads in an SMT core according to an embodiment. Method 700 may be implemented by, but is not limited to, the resource allocator described in any of the aforementioned embodiments. Method 700 begins at the start block. At block 702, a relatively small portion of the out-of-order resource is allocated to each of the threads to be executed by the SMT core. The size of the small portion is selected so that after all threads have been allocated a respective small portion of the resource, there will be still be a sizeable portion of unallocated resource leftover. At block 704, the unallocated portion of the resource is shared between one or more high priority threads.

Figure 8:
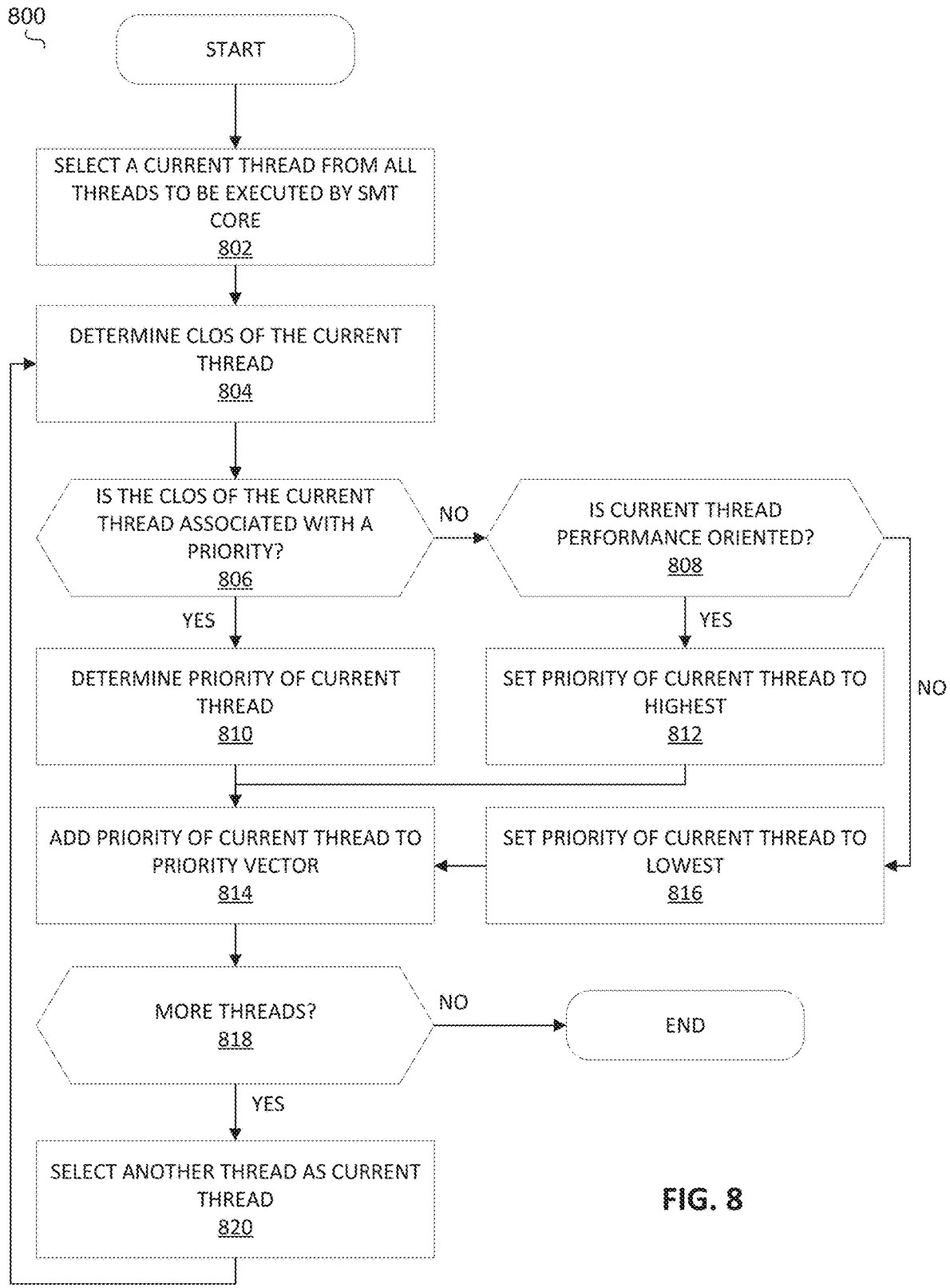
FIG. 8 is a flow diagram illustrating the logic and operations of a method to generate a priority vector according to an embodiment.

FIG. 8 is a flow diagram illustrating the logic and operations of a method to generate a priority vector according to an embodiment. Method 800 may be implemented by, but is not limited to, the priority controller in any of the embodiments described in this disclosure. Method 800 begins at the start block. At block 802, a current thread is selected from threads that are to be executed by a SMT core. At block 804, a CLOS value is determined for the current thread. The CLOS value of the current thread may be determined by accessing the CLOS assignments (e.g., 142 of FIG. 1) which contains a CLOS assignment for each thread. At block 806, a determination is made on whether the CLOS value assigned to the current thread is associated with a priority value. This may be determined by performing a look up in the CLOS-to-priority maps (e.g., 144 of FIGS. 1 and 2). If the CLOS value of the current thread is associated with a priority value, that priority value is determined at block 810 and added to a priority vector (e.g., 112 of FIG. 1) at block 814. If, however, it is determined at block 806 that the CLOS value of the current thread is not associated with a priority value, then at block 808, a determination is made on whether the current thread is performance-oriented and if so, the current thread is assigned a high priority value (e.g., priority value 2) at block 812, which is then added to the priority vector at block 814. If, however, the current thread is not performance-oriented, an indication that it may be power-oriented, then at block 816, the current thread is assigned a low priority value (e.g., priority value 0). The assigned priority value is then added to the priority vector at block 814. At block 818, a determination is made on whether there are more threads to be processed. If not, the method ends. However, if there are more threads to be processed, then at block 820, another thread is selected as the new current thread and the method returns to 804 where the CLOS value of the new current thread is determined.

An example of the present invention is an SMT processor core that includes priority controller circuitry and thread selector circuitry. The priority controller circuitry accesses CLOS-to-priority maps to determine a thread priority value for each of a plurality of threads to be executed by the SMT processor core. The determination is based on a CLOS value assigned to each thread. The priority controller circuitry then generates a priority vector that includes the thread priority value of each of the plurality of threads. Based on each thread's priority value in the priority vector, the thread selector circuitry makes execution cycle assignments of a pipeline by assigning to each of the plurality of threads a portion of the pipeline's execution cycles. A thread with a higher priority value is assigned a larger portion of the execution cycles and a thread with a lower priority value is assigned a smaller portion of the execution cycles, and threads having the same priority value are assigned the same size portion of the execution cycles. The thread selector circuitry then selects from the plurality of threads, tasks to be processed by the pipeline based on the execution cycle assignments. During an execution cycle assigned to a given thread, tasks from that thread will always be selected by the thread selector circuitry before tasks from other threads are selected, so long as there are tasks ready from the thread ready to be processed by the pipeline. If, however, there are no task ready from the given thread, then its execution cycle may be reassigned to another thread. In some cases, if the given thread is associated with the lowest priority value, the execution cycle to which it is assigned may also be reassigned to another thread. The target of the reassignment may be determined based on an LRU or round robin policy. Alternatively, the given thread's execution cycle may be reassigned to another thread having a same or higher priority value as the given thread. If there no such thread exists, then the execution cycle may be reassigned to a thread with the next highest priority value. Examples of the pipeline include instruction decode pipeline, branch prediction pipeline, execution pipeline, retirement pipeline, etc. During resource allocation, the resource allocation circuitry may first assign a portion of a resource to each of the plurality of threads then assign all remaining portions of the resource to one or more threads with the highest priority value in the priority vector. An example of the resource is entries in an execution reservation station of the SMT processor core.

Another example of the present invention is a method that includes: accessing CLOS-to-priority maps to determine a thread priority value for each of a plurality of threads to be executed by an SMT processor core based on a CLOS value assigned to each thread; generating a priority vector comprising the thread priority value of each of the plurality of threads; making execution cycle assignments for a pipeline by assigning to each of the plurality of threads a portion of the pipeline's execution cycles based on each thread's priority value in the priority vector, so that a thread with a higher priority value is assigned a larger portion of the execution cycles and a thread with a lower priority value is assigned a smaller portion of the execution cycles, and threads having the same priority value are assigned the same size portion of the execution cycles. The method further includes selecting, from the plurality of threads, tasks to be processed by the pipeline based on the execution cycle assignments. The method also includes selecting from a given thread, tasks that are ready for execution before selecting tasks from other threads during an execution cycle that is assigned to the given thread. The method may also include determining that the given thread has no task ready to be executed by the pipeline during the given thread's assigned execution cycle or that the given thread is associated with a lowest priority value, and responsively reassigning the given thread's execution cycle to another thread. The method may include reassigning the first execution cycle to another thread of the plurality of threads based on an LRU or round robin policy. Alternatively, the method may include reassigning the given execution cycle to another thread having the same or higher priority value as the given thread or to another thread with the next highest priority value if there are no thread with the same or higher priority value as the given thread. Examples of the pipeline include instruction decode pipeline, branch prediction pipeline, execution pipeline, retirement pipeline, etc. The method may also include assigning a portion of a resource to each of the plurality of threads; and assigning all remaining portion of the resource to one or more threads having the highest priority value among the thread priority values in the priority vector. An example of the resource to be allocated may include entries in an execution reservation station.

Yet another example of the present invention is a system that includes a simultaneous multi-threading (SMT) processor core, storage to store one or more CLOS assignments, CLOS-to-priority maps to store a plurality of priority values, and thread selector circuitry. Each of the CLOS assignments corresponds to one of a plurality of threads to be executed by the SMT processor core and stores a CLOS value assigned to the corresponding thread. Each of the plurality of priority values stored in the one or more CLOS-to-priority maps corresponds to a different CLOS value. The priority controller circuitry accesses the one or more CLOS-to-priority maps to determine a thread priority value for each of a plurality of threads based on the CLOS value assigned to each thread, which is determined by the one or more CLOS assignments. The priority controller circuitry then generates a priority vector that includes the thread priority value of each of the plurality of threads. The thread selector circuitry makes execution cycle assignments of a pipeline by assigning to each of the plurality of threads a portion of the pipeline's execution cycles. The assignment may be based on each thread's priority value in the priority vector. A thread with a higher priority value is assigned a larger portion of the execution cycles and a thread with a lower priority value is assigned a smaller portion of the execution cycles. Threads that have the same priority value are assigned the same size portion of the execution cycles. The thread selector circuitry then selects from the plurality of threads, tasks to be processed by the pipeline based on the execution cycle assignments. During an execution cycle assigned to a given thread, tasks from that thread will always be selected by the thread selector circuitry before tasks from other threads are selected, as long as there are tasks ready from the thread ready to be processed by the pipeline. If, however, there are no task ready from the given thread, then its execution cycle may be reassigned to another thread. In some cases, if the given thread is associated with the lowest priority value, the execution cycle to which it is assigned may be reassigned to another thread. The target of the reassignment may be determined based on an LRU or a round robin policy. Alternatively, the given thread's execution cycle may be reassigned to another thread having a same or higher priority value as the given thread. If there no such thread exists, then the execution cycle may be reassigned to a thread with the next highest priority value. Examples of the pipeline include instruction decode pipeline, branch prediction pipeline, execution pipeline, retirement pipeline, etc. During resource allocation, the resource allocation circuitry may first assign a portion of a resource to each of the plurality of threads then assign all remaining portions of the resource to one or more threads with the highest priority value in the priority vector. An example of the resource is entries in an execution reservation station of the SMT processor core.

Figure 9:
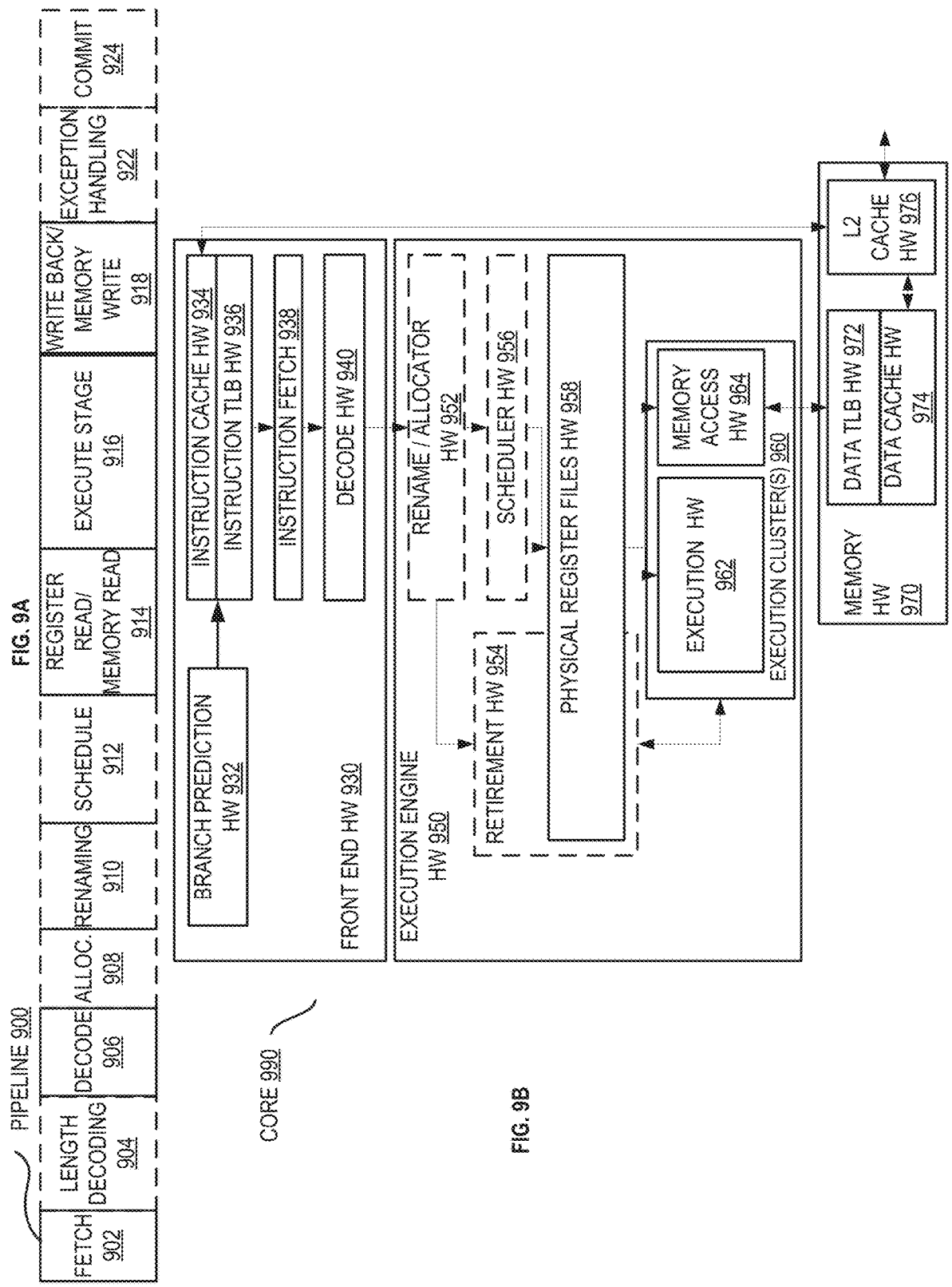
FIG. 9A is a block diagram illustrating both an exemplary in-order pipeline and an exemplary register renaming, out-of-order issue/execution pipeline according to embodiments of the invention.
FIG. 9B is a block diagram illustrating both an exemplary embodiment of an in-order architecture core and an exemplary register renaming, out-of-order issue/execution architecture core to be included in a processor according to embodiments of the invention.

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end hardware 930 coupled to an execution engine hardware 950, and both are coupled to a memory hardware 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end hardware 930 includes a branch prediction hardware 932 coupled to an instruction cache hardware 934, which is coupled to an instruction translation lookaside buffer (TLB) 936, which is coupled to an instruction fetch hardware 938, which is coupled to a decode hardware 940. The decode hardware 940 (or decoder) may decode instructions, and generate as an output one or more micro-operations, micro-code entry points, microinstructions, other instructions, or other control signals, which are decoded from, or which otherwise reflect, or are derived from, the original instructions. The decode hardware 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode hardware 940 or otherwise within the front end hardware 930). The decode hardware 940 is coupled to a rename/allocator hardware 952 in the execution engine hardware 950.

The execution engine hardware 950 includes the rename/allocator hardware 952 coupled to a retirement hardware 954 and a set of one or more scheduler hardware 956. The scheduler hardware 956 represents any number of different schedulers, including reservations stations, central instruction window, etc. The scheduler hardware 956 is coupled to the physical register file(s) hardware 958. Each of the physical register file(s) hardware 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 958 comprises a vector registers hardware, a write mask registers hardware, and a scalar registers hardware. This register hardware may provide architectural vector registers, vector mask registers, and general purpose registers. The physical register file(s) hardware 958 is overlapped by the retirement hardware 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 954 and the physical register file(s) hardware 958 are coupled to the execution cluster(s) 960. The execution cluster(s) 960 includes a set of one or more execution hardware 962 and a set of one or more memory access hardware 964. The execution hardware 962 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 956, physical register file(s) hardware 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 964). It should also be understood that where separate pipelines are used, one or more of these pipelines may be out-of-order issue/execution and the rest in-order.

The set of memory access hardware 964 is coupled to the memory hardware 970, which includes a data TLB hardware 972 coupled to a data cache hardware 974 coupled to a level 2 (L2) cache hardware 976. In one exemplary embodiment, the memory access hardware 964 may include a load hardware, a store address hardware, and a store data hardware, each of which is coupled to the data TLB hardware 972 in the memory hardware 970. The instruction cache hardware 934 is further coupled to a level 2 (L2) cache hardware 976 in the memory hardware 970. The L2 cache hardware 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode hardware 940 performs the decode stage 906; 3) the rename/allocator hardware 952 performs the allocation stage 908 and renaming stage 910; 4) the scheduler hardware 956 performs the schedule stage 912; 5) the physical register file(s) hardware 958 and the memory hardware 970 perform the register read/memory read stage 914; the execution cluster 960 perform the execute stage 916; 6) the memory hardware 970 and the physical register file(s) hardware 958 perform the write back/memory write stage 918; 7) various hardware may be involved in the exception handling stage 922; and 8) the retirement hardware 954 and the physical register file(s) hardware 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 934/974 and a shared L2 cache hardware 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 10:
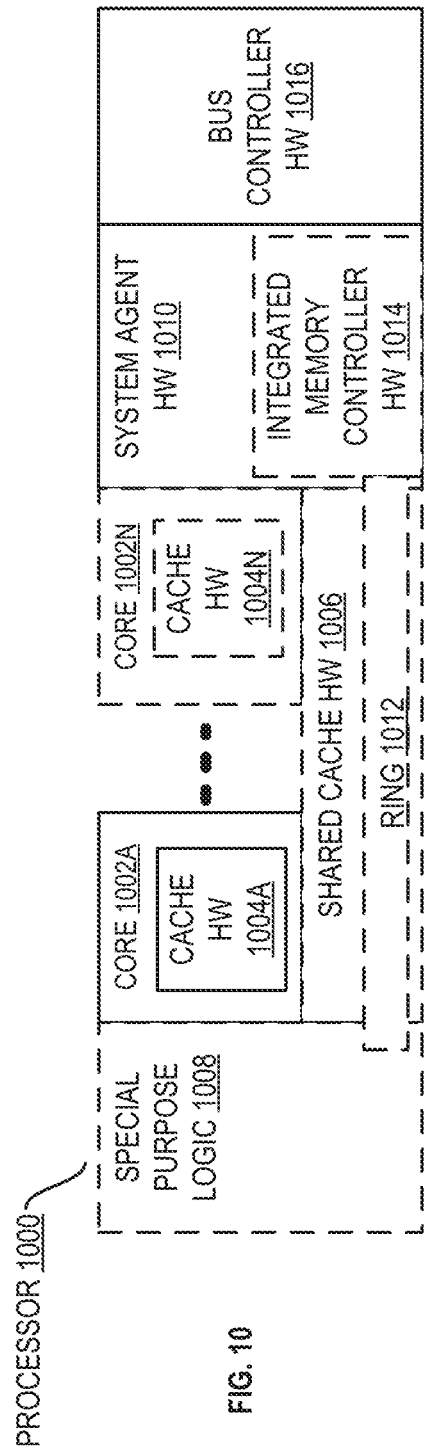
FIG. 10 is a block diagram of a single core processor and a multicore processor with integrated memory controller and graphics according to embodiments of the invention.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller hardware 1016, while the optional addition of the dashed lined boxes illustrates an alternative processor 1000 with multiple cores 1002A-N, a set of one or more integrated memory controller hardware 1014 in the system agent hardware 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 1006, and external memory (not shown) coupled to the set of integrated memory controller hardware 1014. The set of shared cache hardware 1006 may include one or more mid-level caches, such as level 2 (L2), level 3 (L3), level 4 (L4), or other levels of cache, a last level cache (LLC), and/or combinations thereof. While in one embodiment a ring based interconnect hardware 1012 interconnects the integrated graphics logic 1008, the set of shared cache hardware 1006, and the system agent hardware 1010/integrated memory controller hardware 1014, alternative embodiments may use any number of well-known techniques for interconnecting such hardware. In one embodiment, coherency is maintained between one or more cache hardware 1006 and cores 1002-A-N.

In some embodiments, one or more of the cores 1002A-N are capable of multi-threading. The system agent 1010 includes those components coordinating and operating cores 1002A-N. The system agent hardware 1010 may include for example a power control unit (PCU) and a display hardware. The PCU may be or include logic and components needed for regulating the power state of the cores 1002A-N and the integrated graphics logic 1008. The display hardware is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set. In one embodiment, the cores 1002A-N are heterogeneous and include both the "small" cores and "big" cores described below.

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
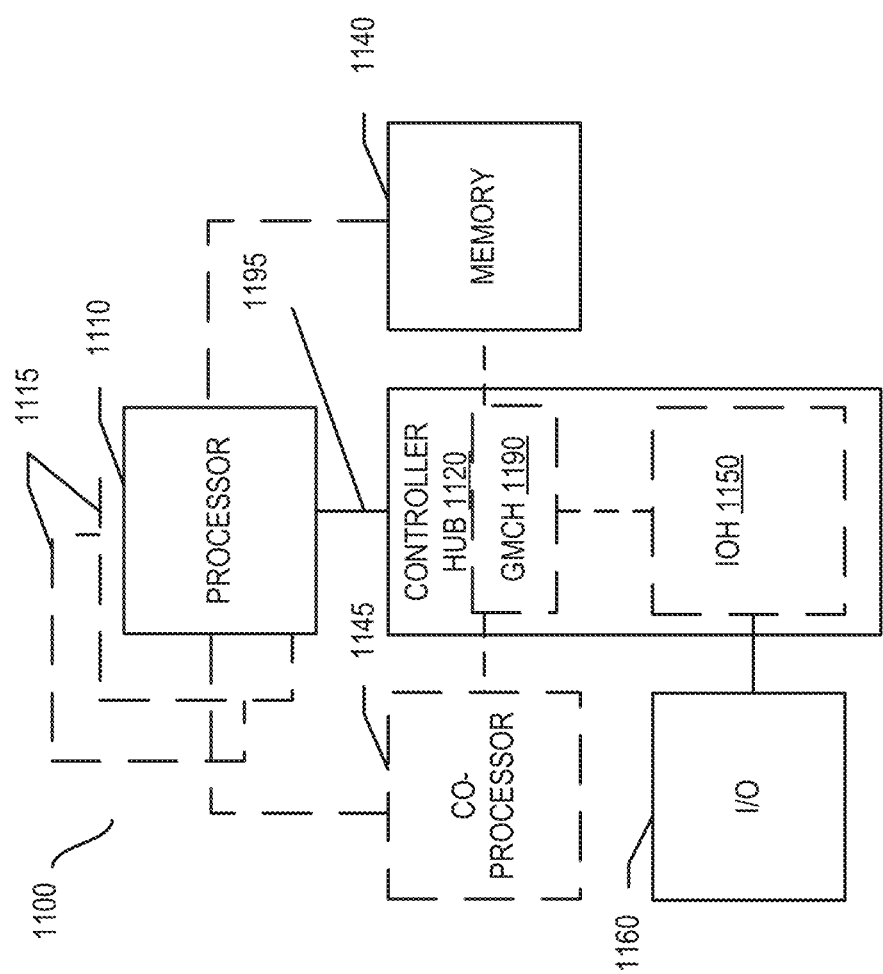
FIG. 11 illustrates a block diagram of a system in accordance with one embodiment of the present invention.

Referring now to FIG. 11, shown is a block diagram of a system 1100 in accordance with one embodiment of the present invention. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface, or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
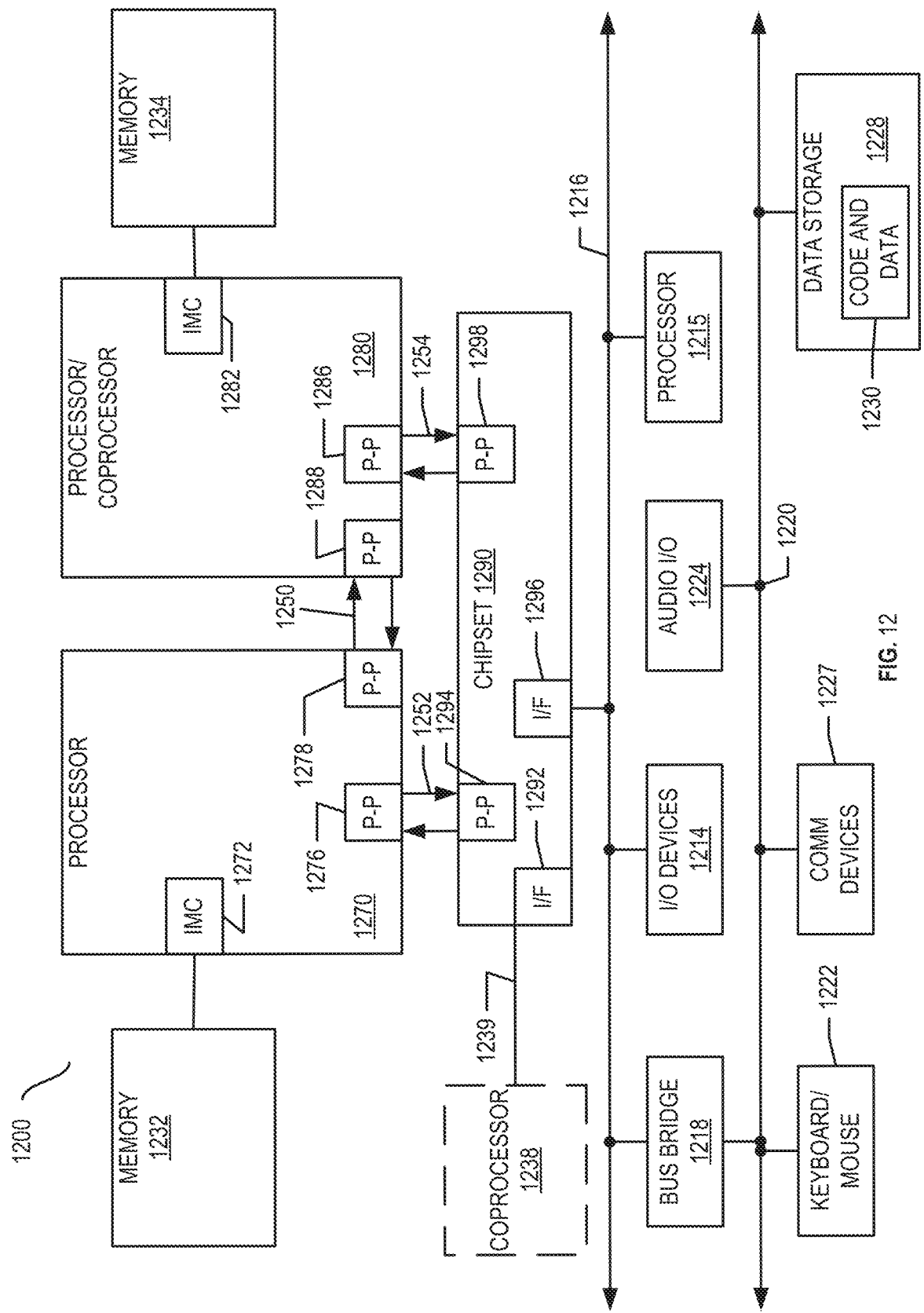
FIG. 12 illustrates a block diagram of a second system in accordance with an embodiment of the present invention.

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) hardware 1272 and 1282, respectively. Processor 1270 also includes as part of its bus controller hardware point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) hardware), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage hardware 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
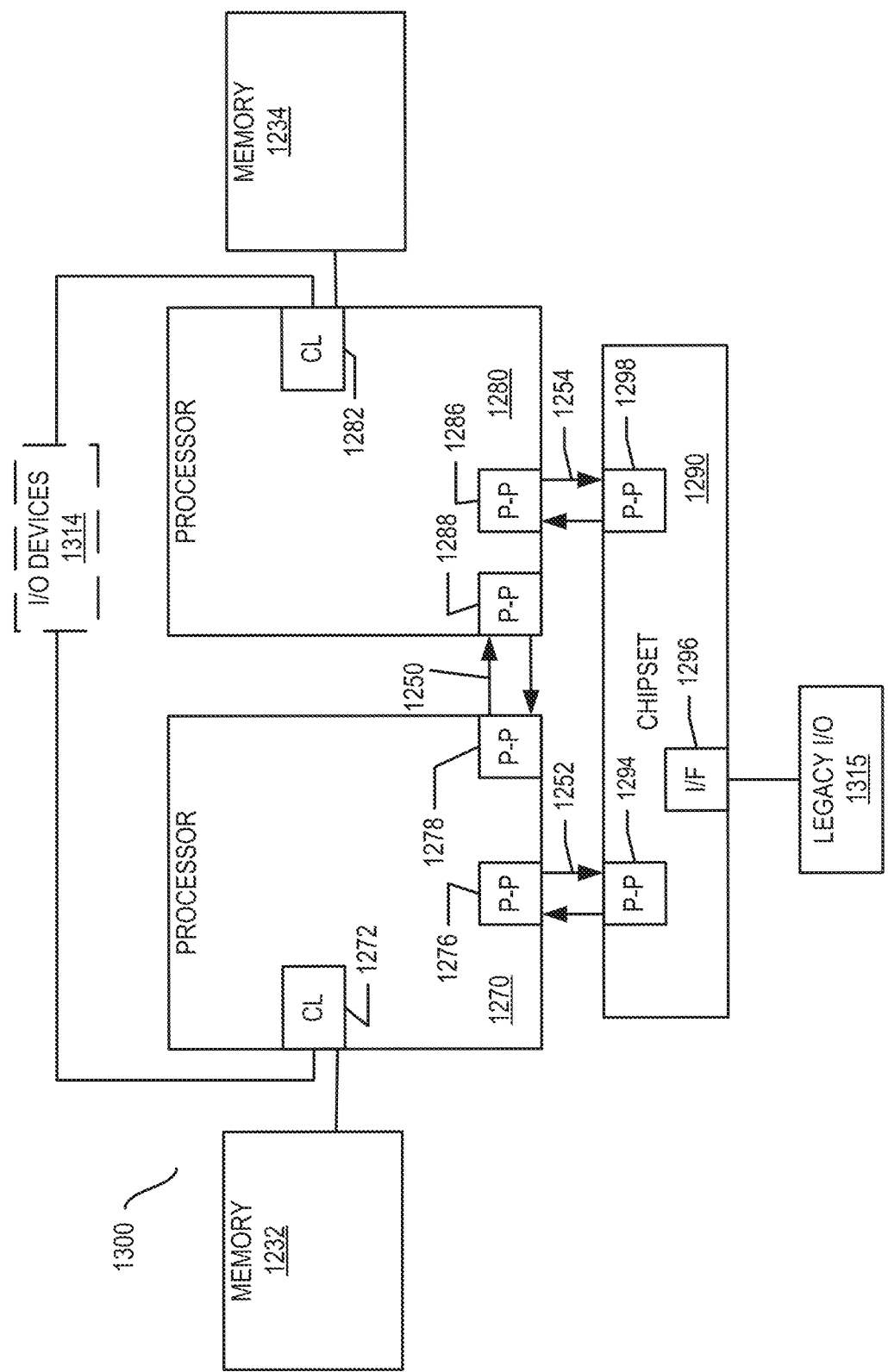
FIG. 13 illustrates a block diagram of a third system in accordance with an embodiment of the present invention.

Referring now to FIG. 13, shown is a block diagram of a second more specific exemplary system 1300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller hardware and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
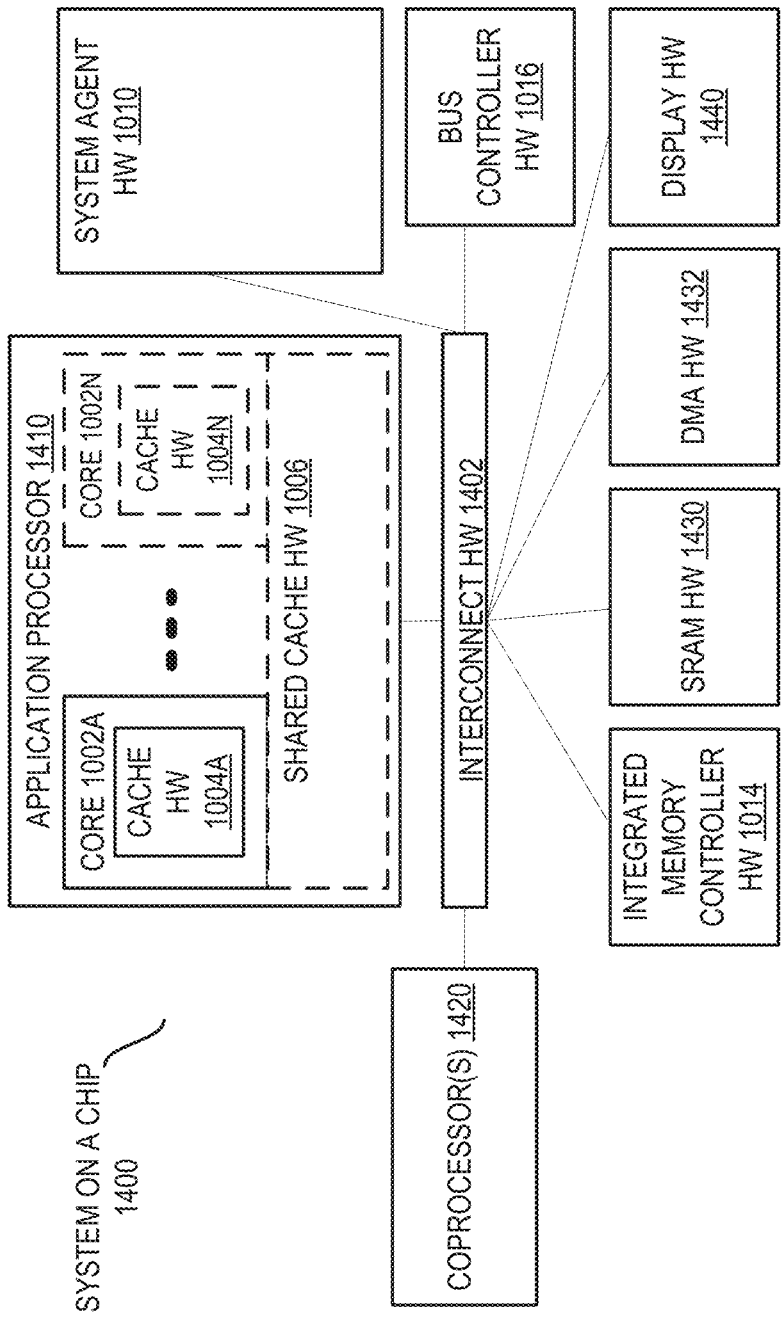
FIG. 14 illustrates a block diagram of a system on a chip (SoC) in accordance with an embodiment of the present invention.

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect hardware 1402 is coupled to: an application processor 1410 which includes a set of one or more cores 1002A-N and shared cache hardware 1006; a system agent hardware 1010; a bus controller hardware 1016; an integrated memory controller hardware 1014; a set or one or more coprocessors 1420 which may include integrated graphics logic, an image processor, an audio processor, and a video processor; an static random access memory (SRAM) hardware 1430; a direct memory access (DMA) hardware 1432; and a display hardware 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A simultaneous multi-threading (SMT) processor core comprising:
priority controller circuitry to access class of service (CLOS)-to-priority maps to determine a thread priority value for each of a plurality of threads to be executed by the SMT processor core based on a CLOS value assigned to each thread, the priority controller circuitry further to generate a priority vector comprising the thread priority value of each of the plurality of threads; and thread selector circuitry to make execution cycle assignments of a pipeline by assigning to each of the plurality of threads a portion of the pipeline's execution cycles based on each thread's priority value in the priority vector, wherein a thread with a higher priority value is assigned a larger portion of the execution cycles and a thread with a lower priority value is assigned a smaller portion of the execution cycles, and threads having a same priority value are assigned a same size portion of the execution cycles, the thread selector circuitry further to select, from the plurality of threads, tasks to be processed by the pipeline based on the execution cycle assignments.

2. The SMT processor core of claim 1, wherein during a first execution cycle assigned to a first thread, tasks from the first thread will always be selected by the thread selector circuitry for processing by the pipeline before tasks from other threads are selected, so long as there are tasks from the first thread ready for processing by the pipeline.

3. The SMT processor of claim 2, wherein when the first thread has no tasks ready for processing by the pipeline, the first execution cycle is reassigned to another thread of the plurality of threads.

4. The SMT processor of claim 3, wherein if the first thread is associated with a lowest priority value, the first execution cycle which was is reassigned to another thread of the plurality of threads.

5. The SMT processor of claim 4, wherein the first execution cycle is reassigned to another thread based on a least recently used (LRU) or a round robin policy.

6. The SMT processor of claim 4, wherein the first execution cycle is reassigned to another thread having a same or higher priority value as the first thread, and when there is no thread having the same or higher priority value as the first thread, the first execution cycle is reassigned to another thread having a next highest priority value after the first thread.

7. The SMT processor core of claim 1, wherein the pipeline comprises one of instruction decode pipeline, branch prediction pipeline, execution pipeline, and retirement pipeline.

8. The SMT processor core of claim 1, further comprising resource allocation circuitry to assign a portion of a resource to each of the plurality of threads and to assign all remaining portion of the resource to one or more threads having a highest priority value among the thread priority values in the priority vector.

9. The SMT processor core of claim 8, wherein the resource comprises entries in an execution reservation station.

10. A method implemented with a processing system comprising at least one processor having thereon memory-stored instructions which, when executed by the processor, cause the processor to perform the method, comprising:

accessing class of service (CLOS)-to-priority maps to determine a thread priority value for each of a plurality of threads to be executed by a simultaneous multi-threading (SMT) processor core based on a CLOS value assigned to each thread;

generating a priority vector comprising the thread priority value of each of the plurality of threads;

making execution cycle assignments for a pipeline by assigning to each of the plurality of threads a portion of the pipeline's execution cycles based on each thread's priority value in the priority vector, wherein a thread with a higher priority value is assigned a larger portion of the execution cycles and a thread with a lower priority value is assigned a smaller portion of the execution cycles, and threads having a same priority value are assigned a same size portion of the execution cycles; and selecting, from the plurality of threads, tasks to be processed by the pipeline based on the execution cycle assignments.

11. The method of claim 10, further comprising selecting from a first thread tasks that are ready for execution before selecting tasks from other threads during a first execution cycle assigned to the first thread.

12. The method of claim 11, further comprising determining that the first thread has no task ready for execution by the pipeline in the first execution cycle or that the first thread is associated with a lowest priority value, and responsively reassigning the first execution cycle to another thread of the plurality of threads.

13. The method of claim 12, further comprising reassigning the first execution cycle to another thread of the plurality of threads based on a least recently used (LRU) or a round robin policy.

14. The method of claim 12, further comprising reassigning the first execution cycle to another thread having a same or higher priority value as the first thread, and reassigning the first execution cycle to another thread having a next highest priority value after the first thread when there is no thread having the same or higher priority value as the first thread.

15. The method of claim 10, wherein the pipeline comprises one of instruction decode pipeline, branch prediction pipeline, execution pipeline, or retirement pipeline.

16. The method of claim 10, further comprising:

assigning a portion of a resource to each of the plurality of threads; and assigning all remaining portion of the resource to one or more threads having a highest priority value among the thread priority values in the priority vector.

17. The method of claim 16, wherein the resource comprises entries in an execution reservation station.

18. A system comprising:

a simultaneous multi-threading (SMT) processor core;

storage to store one or more class of service (CLOS) assignments, each CLOS assignment corresponds to one of a plurality of threads to be executed by the SMT processor core and stores a CLOS value assigned to the corresponding thread;

one or more CLOS-to-priority maps to store a plurality of priority values, each priority value corresponding to a different one of a plurality of CLOS values;

priority controller circuitry to access the one or more CLOS-to-priority maps to determine a thread priority value for each of a plurality of threads based on a CLOS value assigned to each thread in accordance to the one or more CLOS assignments, the priority controller circuitry further to generate a priority vector comprising the thread priority value of each of the plurality of threads; and thread selector circuitry to make execution cycle assignments of a pipeline by assigning to each of the plurality of threads a portion of the pipeline's execution cycles based on each thread's priority value in the priority vector, wherein a thread with a higher priority value is assigned a larger portion of the execution cycles and a thread with a lower priority value is assigned a smaller portion of the execution cycles, and threads having a same priority value are assigned a same size portion of the execution cycles, the thread selector circuitry further to select, from the plurality of threads, tasks to be processed by the pipeline based on the execution cycle assignments.

19. The system of claim 18, wherein during a first execution cycle assigned to a first thread of the plurality of threads, tasks from the first thread that are ready for execution will always be selected for execution by the pipeline before tasks from other threads are selected.

20. The system of claim 19, wherein when the first thread has no tasks ready for execution by the pipeline, or if the first thread is associated with a lowest priority value, the first execution cycle is reassigned to another thread of the plurality of threads.

21. The system of claim 20, wherein the first execution cycle is reassigned to another thread based on a least recently used (LRU) or a round robin policy.

22. The system of claim 20, wherein the first execution cycle is reassigned to another thread having a same or higher priority value as the first thread, and when there is no thread having the same or higher priority value as the first thread, the first execution cycle is reassigned to another thread having a next highest priority value after the first thread.

23. The system of claim 18, wherein the pipeline comprises one of instruction decode pipeline, branch prediction pipeline, execution pipeline, or retirement pipeline.

24. The system of claim 18, further comprising resource allocation circuitry to assign a portion of a resource to each of the plurality of threads and to assign all remaining portion of the resource to one or more threads having a highest priority value among the thread priority values in the priority vector.

25. The system of claim 24 wherein the resource comprises entries in an execution reservation station.

* * * * *